United States Patent [19]
Hartmann

[11] Patent Number: 6,096,091
[45] Date of Patent: Aug. 1, 2000

[54] DYNAMICALLY RECONFIGURABLE LOGIC NETWORKS INTERCONNECTED BY FALL-THROUGH FIFOS FOR FLEXIBLE PIPELINE PROCESSING IN A SYSTEM-ON-A-CHIP

[75] Inventor: Alfred C. Hartmann, Round Rock, Tex.

[73] Assignee: Advanced Micro Devices, Inc., Sunnyvale, Calif.

[21] Appl. No.: 09/028,611

[22] Filed: Feb. 24, 1998

[51] Int. Cl.$^7$ ............................ G06F 17/50; H03K 19/00
[52] U.S. Cl. .............................. 716/17; 716/16; 703/28; 712/15; 712/17
[58] Field of Search ......................... 395/500.18, 500.49, 395/500.17; 710/105, 107; 716/16, 17; 703/28; 712/10, 11, 15, 17

[56] References Cited

U.S. PATENT DOCUMENTS

| | | | |
|---|---|---|---|
| 5,189,665 | 2/1993 | Niehaus et al. | 370/248 |
| 5,233,539 | 8/1993 | Agrawal et al. | 395/500.17 |
| 5,469,558 | 11/1995 | Lieberman et al. | 710/105 |
| 5,850,528 | 12/1998 | Walton et al. | 710/107 |

OTHER PUBLICATIONS

Fawcett et al, "Reconfigurable Processing with Field Programmable Gate Arrays", IEEE Proceedings of the International Conference on Application Specific Systems, Architectures and Processors, pp. 293–302, Aug. 1996.

Rabaey, "Reconfigurable Processing: The Solution to Low–Power Programmable DSP", IEEE 1997 International Conference on Acoustics, Speech, and Signal Processing, pp. 275–278, Apr. 1997.

Rabaey et al, "Heterogeneous Reconfigurable Systems", IEEE 1997 Workshop on Signal Processing Systems, pp. 24–34, Nov. 1997.

The FIPSOC Page—FIPSOC Field Programmable System On Chip, ESPRIT Project Nr 21625, downloaded from http://www.sidsa.es/fipsoc.htm on Jan. 9, 1998, 5 sheets.

Application Brief "An Alternative Capacity Metric for LUT–Based FPGAs," published Feb. 1, 1997 (Version 1.0), pp. 1–5.

Alfke, P., "FPGA Configured Guidelines," Jun. 1, 1996, (Version 1.0), pp. 14–25 to 14–32.

Alfke, P., "Configuring Mixed FPGA Daisy Chains," Jun. 1, 1996, (Version 1.0), pp. 14–33 to14–34.

Alfke, P., "Dynamic Reconfiguration," Jun. 1, 1996, (Version 1.0), pp. 14–39 to14–40.

Bournemouth University Page of Dynamically Reconfigurable Hardware, at http://dec.bournemouth.ac.uk/dec_ind/decind6/drhw_page.htm on Jan. 9, 1998.

XC6200 Field Programmable Gate Arrays, (Version 1.10) Apr. 24, 1997,pp. 1–12.

FPGA Configuration E$^2$PROM Memory: 512K and 1M, ATMEL, Dec. 1997, pp. 1–9.

*Primary Examiner*—Kevin J. Teska
*Assistant Examiner*—Samuel Broda
*Attorney, Agent, or Firm*—Conley, Rose & Tayon, P.C.; Robert C. Kowert; Jeffrey C. Hood

[57] ABSTRACT

An integrated circuit comprising a plurality of reconfigurable logic networks, one or more buffers, a configuration control network, and an embedded processor, all comprised as an integral part of the integrated circuit, and a method of operation of the integrated circuit. One or more of the buffers are coupled between two of the plurality of reconfigurable logic networks. The buffers isolate the plurality of reconfigurable logic networks from one another. The integration control network is coupled to each of the plurality of reconfigurable logic networks, and may also be coupled to one or more buffers. The embedded processor is operable to reconfigure one or more of the plurality of reconfigurable logic networks over the configuration control network. The integrated circuit may also comprise a local memory. The local memory is coupled to the embedded processor, and is operable to store data and/or instructions accessible by the embedded processor. A logic configuration library may also be comprised on the integrated circuit. The logic configuration library is coupled to the embedded processor and is further coupled to the configuration control network. The logic configuration library is operable to store one more configurations for the plurality of reconfigurable logic networks. The reconfigurable logic networks preferably include at least a first logic network and a second logic network.

32 Claims, 3 Drawing Sheets

DYNAMICALLY RECONFIGURABLE LOGIC NETWORKS INTERCONNECTED BY FALL-THROUGH FIFOS FOR FLEXIBLE PIPELINE PROCESSING IN A SYSTEM-ON-A-CHIP

BACKGROUND OF THE INVENTION

1. Field of the Invention

This invention relates to integrated circuits in general and, more particularly, to a system-on-a-chip using dynamically reconfigurable logic islands interconnected by fall-through FIFOs for flexible pipeline processing.

2. Description of Related Art

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place in excess of 50 million transistors on a single integrated circuit or monolithic substrate. It is anticipated that within several years chip makers will be able to place more than 500 million transistors on a single chip. Thus, computer systems are evolving toward comprising a handful of computer chips, where each computer chip comprises a plurality of functions. Moreover, manufacturing a unique variant of a system-on-a-chip for each different application are is very expensive because of the high cost of mask sets (i.e. tooling) for the sub-micron fabrication required for dense systems-on-a-chip. What is needed is a system and method that will bring manufacturing economies of scale to a broad varieties of applications through dynamically reconfigurable logic networks for flexible pipeline processing in a system-on-a-chip.

Additionally, strings of separate logic integrated circuits connected in a daisy-chain fashion suffer from clocking problems. Each logic device must use the clocking of the device feeding it. Therefore, an improved system-on-a-chip architecture is desired which overcomes these problems, allowing each collection of logic to operate semi-autonomously from its neighbors while buffering speed and load variations between pipeline stages.

SUMMARY OF THE INVENTION

The present invention comprises an integrated circuit of dynamically reconfigurable logic networks interconnected by fall-through first-in first out (FIFO) buffers for flexible pipeline processing in a system-on-a-chip. With the dynamically reconfigurable logic networks interconnected by buffering, the logic networks are isolated from timing, clocking and other problems which slow or limit daisy-chaining of dynamically reconfigurable logic. Each logic network can receive a separate clock signal, operate at different speeds, or input/output data as required.

Broadly speaking, the integrated circuit comprises a plurality of reconfigurable logic networks, one or more buffers, a configuration control network, and an embedded processor, all comprised as an integral part of the integrated circuit. One or more of the buffers are coupled between two of the plurality of reconfigurable logic networks. The buffers isolate the plurality of reconfigurable logic networks from one another. The integration control network is coupled to each of the plurality of reconfigurable logic networks, and may also be coupled to one or more buffers. The embedded processor is operable to reconfigure one or more of the plurality of reconfigurable logic networks over the configuration control network.

The integrated circuit also preferably comprises a local memory. The local memory is coupled to the embedded processor, and is operable to store data and/or instructions accessible by the embedded processor. A logic configuration library may also be comprised on the integrated circuit. The logic configuration library is coupled to the embedded processor and is further coupled to the configuration control network. The logic configuration library is operable to store one more configurations for the plurality of reconfigurable logic networks.

In one embodiment the embedded processor is operable to calculate a configuration for one or more of the plurality of reconfigurable logic networks. In another embodiment, the embedded processor is operable to save configurations in the logic configuration library. In still another embodiment, the logic configuration library stores only a precompiled collection of configurations for the plurality of reconfigurable logic networks. The embedded processor is able to select what of the precompiled collection of configurations from the logic configuration library, and then reconfigure one or more of the plurality of reconfigurable logic networks in response to selecting one of the precompiled configurations.

In one embodiment, the plurality of reconfigurable logic networks comprise stages in a pipeline processor configuration. In this configuration, the buffers separating the stages are preferably fall-through first-in first-out buffers. In various embodiments, the reconfigurable logic networks may each separately be any of: programmable array logics, programmable logic devices, field programmable gate arrays, dynamically reconfigurable logics, or dynamically reconfigurable hardware.

A method of operation of the integrated circuit is also presented. The method comprises the embedded processor determining a desired configuration for the reconfigurable logic network. The embedded processor configures the reconfigurable logic networks over the configuration control network with the desired configuration. The first logic network receives a first input and operates on this first input to produce a first output. The first logic network transfers the first output to a respective one of the buffers which is coupled between the first logic network and the second logic network. The respective buffer holds the first output until the second logic network is ready to accept the first output as input. The respective buffer transfers the first output to the second logic network as a second input. The second logic network operates on the second input to produce the second output, and the second logic network outputs the second output.

BRIEF DESCRIPTION OF THE DRAWINGS

A better understanding of the present invention can be obtained when the following detailed description of the preferred embodiment is considered in conjunction with the following drawings, in which.

Figure 1:
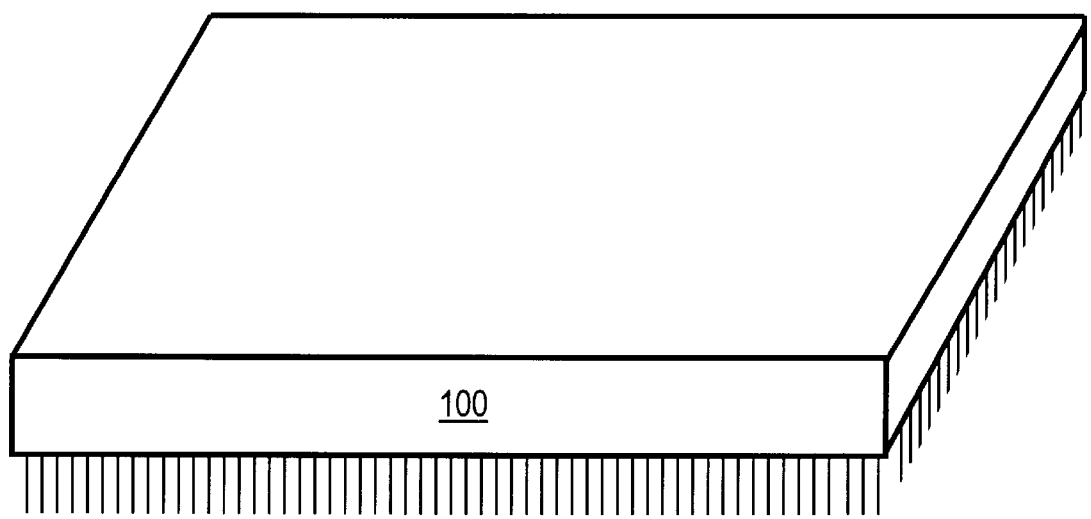
FIG. 1 illustrates a perspective view of an integrated circuit having dynamically reconfigurable logic networks interconnected by fall-through FIFOs for flexible pipeline processing.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

The use of a letter as part of a number designating a component of a system described in this document will be to show multiple instances of equivalent components. All figures will use a uniform numbering system with identical parts across the figures being given identical numbers.

Turning now to the drawings, FIG. 1 shows an integrated circuit, or computer chip, 100 is shown from a perspective view. Integrated circuit 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the integrated circuit 100 may be packaged in any of various ways, including as a surface mount, socket mount, or insertion/socket mount. Materials used in the packaging of integrated circuit 100 may include ceramic packages, leadless chip carrier packages (LCC), glass-sealed packages, or plastic packages. Actual type of chip package for integrated circuit 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 utilizes a generic method for interconnecting multiple groupings of reconfigurable logic on a single computer chip 100 using isolation buffering and reusable configurations. Coupling each logic network to a communications pathway with a programmable controller allows for reuse of generic computer chips 100 for a multiple of uses, such as signal processing, boolean searching, and graphics processing of a single computer chip 100 designed for ease of manufacturing.

Figure 2:
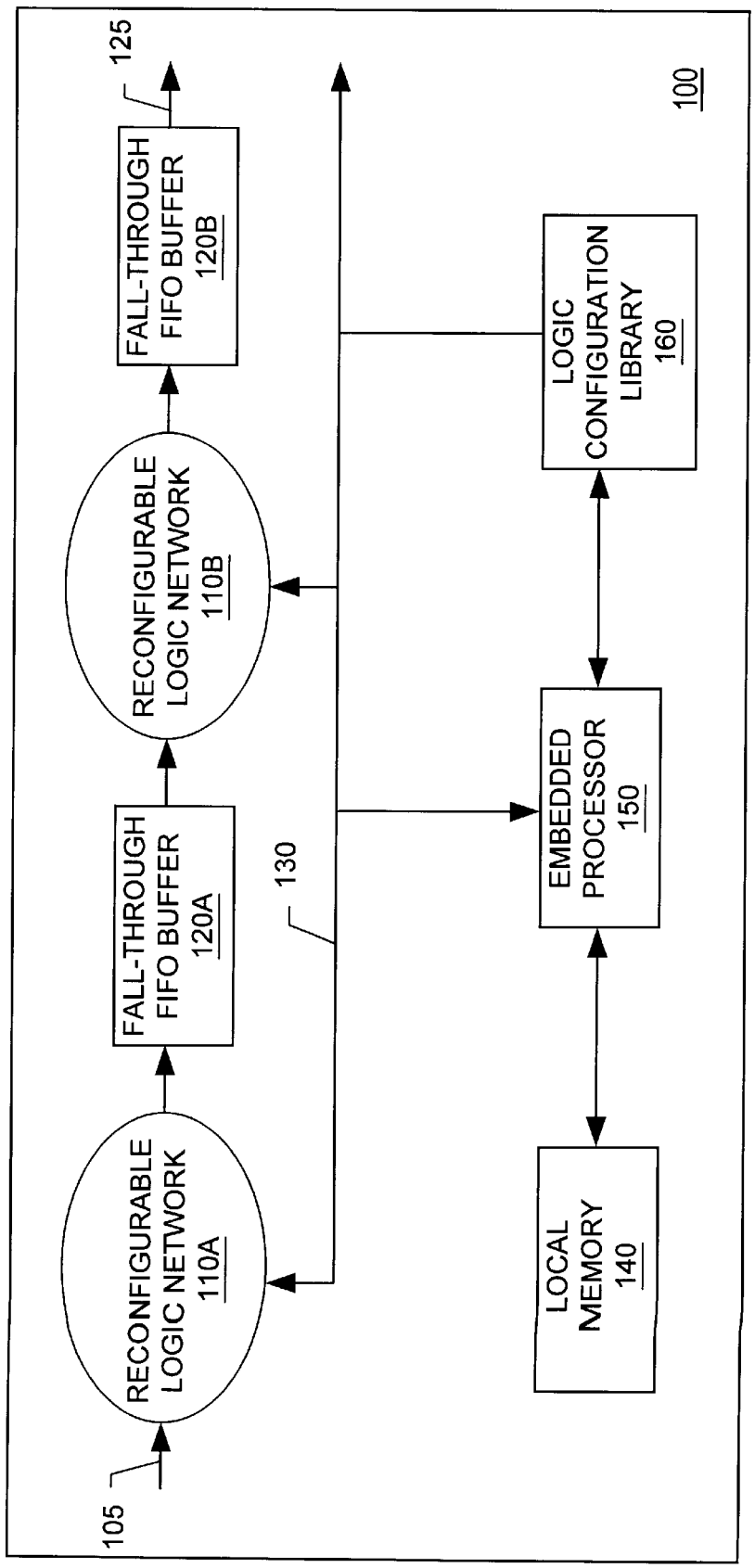
FIG. 2 illustrates an embodiment of the integrated circuit shown in FIG. 1, according to the present invention.

A more detailed look at an embodiment of the integrated circuit 100 of FIG. 1 is given in FIG. 2. Integrated circuit 100 includes a plurality of reconfigurable logic networks 110A/B, also referred to as simply logic networks. Coupled between the reconfigurable logic networks 110, are buffers 120A/B, preferably fall-through first-in first-out (FIFO) buffers. A configuration control network 130 is coupled to each of the reconfigurable logic networks 110A/B. Also coupled to the configuration control network 130 is an embedded processor 150. The embedded processor 150 operates to reconfigure one or more of the plurality of reconfigurable logic networks 110. Optionally coupled to the embedded processor 150 are a local memory 140 and/or a logic configuration library 160. Each component of integrated circuit 100 is physically a part of the integrated circuit 100.

The reconfigurable logic networks 110 may be of any desirable type of logic, such as programmable array logics (PALs), programmable logic devices (PLDs), field programmable gate arrays (FPGAs), or any other dynamically reconfigurable logic (DRL) or dynamically reconfigurable hardware (DRH), as these terms are known in the art. It is noted that the reconfigurable logic networks 110 may be comprised of a logic type which is reconfigurable only once, as well as logic which can be reconfigured multiple times. It may be desirable to prevent future reconfiguration. Furthermore, additional components may also be added to the reconfigurable logic networks 110 as desired, such as digital or analog components including analog to digital converters (ADCs), digital to analog converters (DACs), filters and comparators. Other components may also be included as desired.

Reconfiguration of the reconfigurable logic networks 110 may be "run-time" or "on-the-fly" reconfiguration of all reconfigurable logic networks 110. One or more the reconfigurable logic networks 110 may reconfigure separately or partially or at "local run-time", as desired. Local reconfigurations, if present, are preferably "non-disruptive", to other operations on the integrated circuit 100.

The buffers 120 operate to isolate each of the reconfigurable logic networks 110 from each other. This allows each of the reconfigurable logic networks 110 to operate on a separate clock. Input into the first reconfigurable logic network 110A through connection 105 may be from a buffer 120 not shown or may be from elsewhere on the integrated circuit 100 or from off the integrated circuit 100. Output from buffer 120B through connection 125 may be input into an additional reconfigurable logic network 110, or may be final output for use elsewhere on the integrated circuit 100 or off of integrated circuit 100. In one embodiment, the buffers 120 are fall-through buffers which provide only a negligible delay inside the buffer 120. In another embodiment, the buffers 120 are FIFO buffers 120. In the preferred embodiment, the buffers 120 are fall-through FIFO buffers 120.

The embedded processor 150 issues commands to the reconfigurable logic networks 110 to control the reconfiguration of the reconfigurable logic networks 110. The embedded processor 150 is preferably one of the AMD E86 family of embedded processors, such as the ElanSC310 or Am486DX5, although an embedded processor from another manufacturer or of another design, such as a RISC architecture, may also be used. A specialized, dedicated control processor may also be used, including a customized instruction set for this purpose, as desired.

The logic configuration library 160 operates to store one or more configurations for one or more of the reconfigurable logic networks 110. These configurations can be read by the embedded processor 150, manipulated by the embedded processor 150, stored temporarily in local memory 140, and/or programmed into one or more of the reconfigurable logic networks 120 over the configuration control network 130. A given configuration may further require the embedded processor 150 to instruct one or more of the buffers 120 to change its operating characteristics, such as adding a delay, or reordering its buffered data. In one embodiment, the logic configuration library 160 is programmed at the time of manufacture with a hard coded set of configurations. In another embodiment the logic configuration library 160 stores new configurations as determined by the embedded processor 150. The logic configuration library 160 may be comprised of registers, memory cells, such as ROM, RAM or flash memory, or discrete logic cells, or flip flops, or another storage device.

In one embodiment, the integrated circuit 100 has a fixed number of input and output pins or connections. Inputs and outputs to the plurality of reconfigurable logic networks 110 may occur only at the start of the pipeline, input to a first stage, and at the end of the pipeline, output at a last stage. In other words, inputs are given only to reconfigurable logic network 110A, and outputs are received only from reconfigurable logic network 110C, for example, assuming that the last reconfigurable logic network 110 in the pipeline is 110C. In another embodiment inputs and outputs may be transferred to and from any one of the reconfigurable logic networks 110. That is, inputs and outputs may be transferred to and from any stage of the pipeline processor so it may exhibit a more general network-like structure rather than only a linear pipeline structure. In an embodiment including both digital and analog components in the reconfigurable logic networks 110, both digital and analog inputs and outputs may be available for any or all of the separate reconfigurable logic networks 110.

Figure 3:
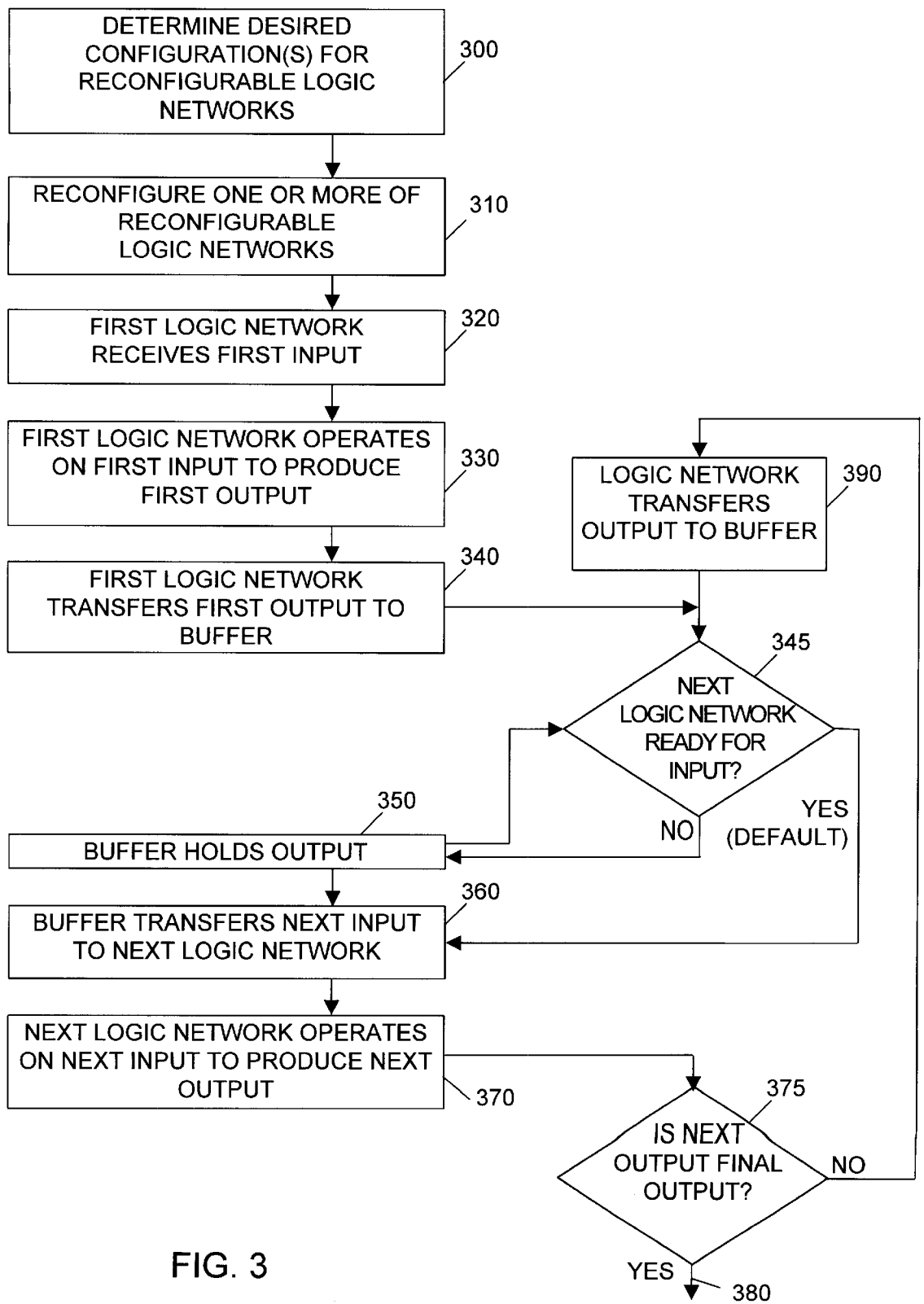
FIG. 3 is a flowchart diagram illustrating an embodiment of the operation of the integrated circuit according to the present invention.

An embodiment of the operation of the integrated circuit 100 is detailed in the flowchart of FIG. 3. A desired configuration for one or more of the reconfigurable logic networks 110 is determined 200. This determining 200 may be made by the user or the determining 200 may be made by the embedded processor 150. The user may issue a command to the embedded processor 150 to choose a particular configuration, which may be stored in the embedded processor 150, the local memory 140, or the logic configuration library 160. In another embodiment, the user may instruct the embedded processor 150 to calculate or process a configuration for one or more of the reconfigurable logic networks 110 based upon guidelines entered by the user. Once a desired configuration has been determined 200, the embedded processor 150 reconfigures one or more of the reconfigurable logic networks 110 in response 210.

After the reconfigurable logic networks 110 are configured as desired 310, the first logic network 110A is ready to receive input 320. The first logic network 110A acts upon its input and produces first output 330. The first logic network 110A transfers first output to a holding buffer 120A in 340. Decision block 345 is a choice between buffer 120 holding the output in 315 or transferring the output as input to the next logic network 110 in 360. The default response is "yes", transferring the input as output to the next logic block 110 in 360, although the buffer 120 will hold, i.e. buffer, the output 350, if necessary, until the next logic network 120 is ready for input 345. The buffer 120 transfers the input to the next logic network 110 in 360.

The next logic network 110 operates on its input to produce its output in 370. If the output in 370 is a final output for the pipeline processor's configuration, as determined in decision block 375, then the output is transferred to a desired location in 380. If the output in 370 is not a final output for the pipeline processor's configuration 375, then the output is transferred to a buffer 390. Decision block 345 is again a choice between buffer 120 holding the output in 390 or transferring the output as input to the next logic network 110 in 360. The default response is "yes", transferring the input as output to the next logic block 110 in 360, although the buffer 120 will hold, i.e. buffer, the output 350, if necessary, until the next logic network 120 is ready for input 345. The buffer 120 transfers the input to the next logic network 110 in 360. Transferring and buffering occur until decision block 375 determines that the output in 370 is a final output 380.

Various modifications to the flowchart shown in FIG. 3 are contemplated, including various outputs and inputs being accepted at any one of the logic networks 110 or buffers 120. The chain of logic networks 110 may be of any length, either limited to a single integrated circuit 100, or passing various inputs and outputs between a plurality of integrated circuits 100. Each integrated circuit 100 may be identical or specialized in a special purpose configuration.

Therefore, the present invention is believed to comprise a plurality of dynamically reconfigurable logic networks interconnected by buffering for flexible pipeline processing in a system-on-a-chip. Although the system and method of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An integrated circuit, the integrated circuit comprising:
   a plurality of reconfigurable logic networks comprised on said integrated circuit;
   one or more buffers comprised on said integrated circuit, wherein said one or more buffers are coupled between said plurality of reconfigurable logic networks, wherein said one or more buffers isolate said plurality of reconfigurable logic networks from each other to allow for pipelined processing through said plurality of reconfigurable logic networks;
   a configuration control network comprised on said integrated circuit, wherein said configuration control network is coupled to each of said plurality of reconfigurable logic networks; and
   an embedded processor comprised on said integrated circuit, wherein said embedded processor is operable to reconfigure one or more of said plurality of reconfigurable logic networks over said configuration control network.

2. The integrated circuit of claim 1, further comprising:
   a local memory comprised on said integrated circuit, wherein said local memory is coupled to said embedded processor, wherein said memory is operable to store data accessible by said embedded processor.

3. The integrated circuit of claim 1, wherein said embedded processor is operable to calculate a new configuration for said plurality of reconfigurable logic networks, wherein said embedded processor is further operable to reconfigure one or more of the plurality of reconfigurable logic networks with said new configuration.

4. The integrated circuit of claim 3, further comprising:
   a logic configuration library comprised on said integrated circuit, wherein said logic configuration library is coupled to said embedded processor, wherein said logic configuration library is further coupled to said configuration control network, wherein said logic configuration library is operable to store one or more configurations for said plurality of reconfigurable logic networks.

5. The integrated circuit of claim 4, wherein said embedded processor is further operable to save said new configuration in said logic configuration library after said embedded processor has processed said new configuration.

6. The integrated circuit of claim 4, wherein said logic configuration library stores a pre-compiled collection of configurations for said plurality of reconfigurable logic networks.

7. The integrated circuit of claim 4, wherein said embedded processor is further operable to select one of said pre-compiled collection of configurations, wherein said embedded processor is further operable to reconfigure one or more of said plurality of reconfigurable logic networks in response to said selection of one of said pre-compiled collection of configurations.

8. The integrated circuit of claim 1, wherein said plurality of reconfigurable logic networks are configured as a pipeline processor, wherein said plurality of reconfigurable logic networks comprise stages of said pipeline processor.

9. The integrated circuit of claim 1, wherein said one or more buffers are fall-through first-in first-out buffers.

10. The integrated circuit of claim 1, wherein each of the plurality of reconfigurable logic networks is defined by a programmable array logic.

11. The integrated circuit of claim 1, wherein said plurality of reconfigurable logic networks are each operable to clock independently on different clock signals.

12. A method for operating an integrated circuit, wherein said integrated circuit includes a plurality of reconfigurable logic networks including a first logic network and a second logic network, one or more buffers coupled between said plurality of reconfigurable logic networks, a configuration control network coupled to each of said plurality of reconfigurable logic networks, and an embedded processor coupled to said configuration control network, the method comprising:

said embedded processor determining a desired configuration for said plurality of reconfigurable logic networks;

said embedded processor configuring said plurality of reconfigurable logic networks over said configuration control network;

said first logic network receiving a first input;

said first logic network operating on said first input to produce a first output;

said first logic network transferring said first output to a respective one of said one or more buffers coupled between said plurality of reconfigurable logic networks, wherein said respective one is coupled between said first logic network and said second logic network;

said respective one holding said first output until said second logic network is ready to be accepting said first output as a second input;

said respective one transferring said first output to said second logic network as said second input;

said second logic network operating on said second input to produce a second output; and said second logic network outputting said second output.

13. The method of claim 12, wherein said one or more buffers are FIFO buffers, the method further comprising:

said respective one holding said first output in the order received from said first logic network; and said respective one transferring said first output to said second logic network as said second input in the order received from said first logic network.

14. The method of claim 12, wherein said one or more buffers are fall-through buffers, the method further comprising:

said transferring occurring without substantial buffering delay in said respective one in response to said accepting.

15. The method of claim 12, wherein said integrated circuit further includes a logic configuration library coupled to said embedded processor and said configuration control network, wherein said logic configuration library includes a plurality of reusable configurations for said plurality of reconfigurable logic networks, the method further comprising:

said embedded processor determining said desired configuration from said plurality of reusable configurations.

16. The method of claim 15, the method further comprising:

said embedded processor storing said desired configuration in said logic configuration library after said determining.

17. An integrated circuit, the integrated circuit comprising:

a plurality of reconfigurable logic networks comprised on said integrated circuit;

one or more buffers comprised on said integrated circuit, wherein said one or more buffers are coupled between said plurality of reconfigurable logic networks, wherein said one or more buffers isolate said plurality of reconfigurable logic networks from each other to allow for pipelined processing through said plurality of reconfigurable logic networks;

a configuration control network comprised on said integrated circuit, wherein said configuration control network is coupled to each of said plurality of reconfigurable logic networks;

an embedded processor comprised on said integrated circuit, wherein said embedded processor is operable to reconfigure one or more of said plurality of reconfigurable logic networks over said configuration control network;

a local memory comprised on said integrated circuit, wherein said local memory is coupled to said embedded processor, wherein said memory is operable to store data accessible by said embedded processor; and a logic configuration library comprised on said integrated circuit, wherein said logic configuration library is coupled to said embedded processor, wherein said logic configuration library is further coupled to said configuration control network, wherein said logic configuration library is operable to store one or more configurations for said plurality of reconfigurable logic networks.

18. The integrated circuit of claim 17, wherein said plurality of reconfigurable logic networks are configured as a pipeline processor.

19. The integrated circuit of claim 17, wherein said one or more buffers are fall-through first-in first-out buffers.

20. The integrated circuit of claim 17, wherein each of the plurality of reconfigurable logic networks is defined by a programmable array logic.

21. An integrated circuit, the integrated circuit comprising:

means for storing data and instructions;

a processing means coupled to said means for storing data and instructions, wherein said processing means is operable to store said data and said instructions in said means for storing data and instructions;

a plurality of computing means configured as stages of a pipeline processor;

one or more buffering means, wherein each of said one or more buffering means is coupled between two of said plurality of computing means;

a networking means for distributing commands from said processing means to said plurality of computing means and said one or more buffering means; and means for storing configurations for said plurality of computing means.

22. The integrated circuit of claim 1, wherein each of the plurality of reconfigurable logic networks is defined by a programmable logic device.

23. The integrated circuit of claim 1, wherein each of the plurality of reconfigurable logic networks is defined by a field programmable gate array.

24. The integrated circuit of claim 1, wherein each of the plurality of reconfigurable logic networks is defined by a dynamically reconfigurable logic.

25. The integrated circuit of claim 1, wherein each of the plurality of reconfigurable logic networks is defined by a dynamically reconfigurable hardware.

26. The integrated circuit of claim 17, wherein each of the plurality of reconfigurable logic networks is defined by a programmable logic device.

27. The integrated circuit of claim 17, wherein each of the plurality of reconfigurable logic networks is defined by a field programmable gate array.

28. The integrated circuit of claim 17, wherein each of the plurality of reconfigurable logic networks is defined by a dynamically reconfigurable logic.

29. The integrated circuit of claim 17, wherein each of the plurality of reconfigurable logic networks is defined by a dynamically reconfigurable hardware.

30. An integrated circuit comprising:

plurality of reconfigurable logic networks;

a data buffer coupled between a pair of the plurality of reconfigurable logic networks to allow for pipelined processing through said plurality of reconfigurable logic networks;

a configuration control network coupled to each of said plurality of reconfigurable logic networks;

an embedded processor;

wherein said embedded processor is operable to calculate a new configuration for one of said plurality of reconfigurable logic networks, wherein said embedded processor is further operable to reconfigure the one of the plurality of reconfigurable logic networks with said new configuration.

31. The integrated circuit of claim 30 further comprising:

a logic configuration library coupled to said embedded processor, wherein said logic configuration library is configured to store one or more configurations for each of said plurality of reconfigurable logic networks;

wherein the embedded processor is configured to read a configuration stored therein, and wherein said embedded processor is operable to reconfigure a reconfigurable logic network in accordance with the configuration read from the configuration library.

32. A method for operating an intergrated circuit, wherein said integrated circuit comprises a plurality of reconfigurable logic networks including a first reconfigurable logic network and a second reconfigurable logic network, a data buffer coupled between the first and second reconfigurable logic networks, a configuration control network coupled to each of said plurality of reconfigurable logic networks, and an embedded processor coupled to said configuration control network, the method comprising:

said embedded processor manipulating a configuration for a reconfigurable logic network;

said embedded processor configuring said first reconfigurable logic network via said configuration control network in accordance with the manipulated configuration to operate as a pipeline stage in conjunction with said second reconfigurable logic network.

* * * * *

UNITED STATES PATENT AND TRADEMARK OFFICE
CERTIFICATE OF CORRECTION

PATENT NO. : 6,096,091
DATED : August 1, 2000
INVENTOR(S) : Alfred C. Hartmann

It is certified that error appears in the above-identified patent and that said Letters Patent is hereby corrected as shown below:

Claim 30, col. 9, line 36, please insert --a-- before "plurality of".

Signed and Sealed this

Twenty-second Day of May, 2001

*Attest:*

NICHOLAS P. GODICI

*Attesting Officer*    *Acting Director of the United States Patent and Trademark Office*